United States Patent [19]
Bayraktar

[11] Patent Number: 6,016,340
[45] Date of Patent: Jan. 18, 2000

[54] BILLING SCHEME FOR A TELECOMMUNICATIONS NETWORK

[75] Inventor: Arsavir Bayraktar, Paris, France

[73] Assignee: Northern Telecom Limited, Montreal, Canada

[21] Appl. No.: 08/988,579

[22] Filed: Dec. 11, 1997

[30] Foreign Application Priority Data

Apr. 28, 1997 [EP] European Pat. Off. .............. 97106987
May 28, 1997 [EP] European Pat. Off. .............. 97108586

[51] Int. Cl.$^7$ ............................ H04M 15/00; H04M 1/24
[52] U.S. Cl. ........................... 379/114; 379/115; 379/13; 379/14; 379/112; 379/126; 370/244
[58] Field of Search .................................... 379/114, 115, 379/121, 126, 219–230, 13–14; 370/333, 472, 473, 476, 244, 248, 250, 252, 429, 395

[56] References Cited

U.S. PATENT DOCUMENTS

| | | | |
|---|---|---|---|
| 4,447,903 | 5/1984 | Sewerinson | 371/68 |
| 4,953,197 | 8/1990 | Kaewell, Jr. et al. | 379/58 |
| 5,268,909 | 12/1993 | Loebig | 379/244 |
| 5,369,680 | 11/1994 | Borbas et al. | 379/13 |
| 5,406,563 | 4/1995 | Loebig | 370/244 |
| 5,504,611 | 4/1996 | Carbone, Jr. et al. | 379/114 |
| 5,539,802 | 7/1996 | De Caluwe et al. | 379/13 |
| 5,550,904 | 8/1996 | Andruska et al. | 379/115 |
| 5,590,181 | 12/1996 | Hogan | 379/114 |
| 5,659,593 | 8/1997 | Dvora Izvieli | 379/114 |
| 5,729,588 | 3/1998 | Chin et al. | 379/14 |
| 5,822,414 | 10/1998 | Reding et al. | 379/114 |
| 5,841,847 | 11/1998 | Graham et al. | 379/114 |
| 5,878,114 | 3/1999 | Son | 379/13 |
| 5,907,603 | 5/1999 | Gallagher et al. | 379/114 |

FOREIGN PATENT DOCUMENTS

| | | | |
|---|---|---|---|
| 05014554 | 1/1993 | European Pat. Off. | H04M 15/34 |
| 3716594A1 | 12/1988 | Germany | H04L 11/08 |

OTHER PUBLICATIONS

Bellcore specification TR–TSY–00508 (1987).

*Primary Examiner*—Curtis A. Kuntz
*Assistant Examiner*—Rexford N. Barnie
*Attorney, Agent, or Firm*—Lee, Mann, Smith, McWilliams, Sweeney & Ohlson

[57] ABSTRACT

A billing scheme for a telecommunications network is described in which a billing record for a call including at least a plurality of data bytes is generated in a switch (10), each billing record is duplicated, and check information is generated from each data byte of a billing record and associated with each said data byte to form a protected billing record. Each protected billing record of a duplicated pair is transmitted via two independent transmission lines to processing means (40, 50) in which the associated check information is generated byte-for byte from each received billing record and the generated check information is compared byte-for-byte with the transmitted check information in parity checking circuits (60, 61). If for any one byte of a billing record, the generated check information does not agree with the received check information, that billing record is discarded. If there is no inconsistency between the received and generated check information for both billing records of a duplicated pair, the two billing records of the pair are compared bit-for-bit in a comparator (70). If any difference is found between the billing records of the pair, both billing records are discarded. Otherwise the received billing records are stored in non-volatile memory (75).

28 Claims, 4 Drawing Sheets

| Parity checking | | Comparison bit-by-bit | Selection logic |
|---|---|---|---|
| First CDR | Second CDR | Both CDR's | |
| $P_{correct}$ | $P_{correct}$ | identical | store at least one of the CDR's |
| $P_{correct}$ | $P_{correct}$ | not identical | discard both CDR's |
| $P_{correct}$ | $P_{incorrect}$ | no comparison | store first CDR |
| $P_{incorrect}$ | $P_{correct}$ | no comparison | store second CDR |
| $P_{incorrect}$ | $P_{incorrect}$ | no comparison | discard both CDR's |

Fig. 6

BILLING SCHEME FOR A TELECOMMUNICATIONS NETWORK

The present invention relates to a telecommunications network and a node for use in the network and, in particular, to a scheme for transmitting records with improved reliability, as well as a methods of operating such a network and such a node. The present invention is particularly suitable for a billing scheme in a telecommunications network.

TECHNICAL BACKGROUND

When providing a telecommunications network it is usually necessary to bill the user's depending upon their use of the network, e.g. depending upon the time of the calls and their destination and sometimes depending on the quality of the service, the time of day of the call or the paths used through the network. To bill users incorrectly is not only embarrassing but also reduces the user trust in the system and may even lead to users taking legal action against the network operator. The Bellcore, USA specification TRTSY-00508 (1987) requires that less than eleven in one hundred thousand calls are not billed and less than three calls in one million are incorrectly billed.

General methods of providing error detection on digital telecommunication systems are known, for instance the attachment of a parity bit or bits to each transmitted word of data. After transmission of such words over a telecommunication network, the parity information for each word can be recalculated and compared with the transmitted parity information. If these two do not agree, then it can be assumed that there has been an error caused by the transmission either in the parity information or in the word. However, if the contents of a data word are consistent with the parity information, there is no guarantee that the transmission has been free of errors as a double error may have been caused which leaves that parity information consistent with the modified data word.

Several methods are known for improving the reliability of transmitted data, for instance "loop or echo checking" in which the received data word is sent back to the transmitter and the original data word is compared with the word transmitted over the forward and reverse transmission lines. Forward error correction makes use of more complex check codes in which the number of check bits can be as long as the data word transmitted and there are diminishing returns in having such long error checking and correction additions to a data word. Still another method is described in U.S. Pat. No. 4,953,197 in which two signals are received from two antennae in parallel, quality data and parity information are checked for each data word received from the two antennae and the best selected. In such a system, if an error is detected in one word of the two, it cannot be determined which of the two words is actually the correct one. U.S. Pat. No. 5,268,909, U.S. Pat. No. 5,406,563 and U.S. Pat. No. 5,406,563 all describe methods of routing signals synchronously and in parallel and checking not only the parity for each received data word but also comparing the contents of the same word received via the two routes through the network. In particular, with these known systems, the parallely received data words are compared bit-for-bit in a single comparator after a parity check has been performed. The transmission of the words from the parity checker to the comparator can introduce further transmission errors thus falsifying the results of the comparison. Such schemes have been devised for transmission of user messages in which it is necessary to transmit some data even if it is not perfect rather than transmit gaps in the messages. Further, these methods have been devised for real time synchronous transmission, and even storing on a disc is not acceptable because of the access time to the information on the disc. These conventional schemes are unrelated to the present invention and are unsuitable for billing operations.

DE-A-37 16 549 describes a circuit for telecommunication networks including memory means wherein the main memory is duplicated and the parity check bit for each byte stored in the main memory is stored in a separate third memory. As an alternative, the parity bits for the respective memory entries may be stored in a part of the main memories. If two bytes are read out of the main memories and one of them is not consistent with the parity bit read out of the third memory, this record is not accepted. If the bytes are bit-for-bit identical but they both are not consistent with the parity read from the third memory, it is assumed that the byte is correct and the stored parity bit is incorrect. This system has the disadvantage that three memories are required. In the alternative in which the parity bits are stored in the main memory, an error in read bytes is determined by a bit-for-bit comparison. If a difference between two bytes is detected, the respective parity bits can be used to determine which one of the two bytes read out of the main memories is probably correct. If no difference is detected between the bytes, the bytes are considered to be correct independent of the associated parity bits.

U.S. Pat. No. 5,590,181 describes a call-processing system with a matrix switch and a network control processor for controlling the switch and which can generate billing records. The known system includes the use of more than one memory to store billing records for security purposes.

It is an object of the present invention to provide a telecommunications network, method of operating such a network and a processor for carrying out the method in which the transmission of records is carried out more reliably.

SUMMARY OF THE INVENTION

The present invention provides a secure way of transmitting data, in particular the transmission of billing records from a switch to an application platform. The scheme includes duplicating each record, including check information such as parity bits in each record before transmission to an external processor on the application platform, examining the check information on arrival at the processor, rejecting each record which contains a check information error and also rejecting records which do not contain check information errors but which are not identical. Preferably the pair of records is sent at slightly different times to avoid electromagnetic interference.

As an alternative, the bytes in a record which are not consistent with their check information can be flagged as erroneous and corrected records may be constructed from bytes which are free of check information errors using both records of a pair. In accordance with the present invention the record may be a billing record and the record may be sent between a switch and an external processor.

The present invention provides a method of operating a telecommunications network including at least one switch means for routing calls and a processing means, comprising the steps of generating a record for a call including at least a plurality of data bytes; duplicating each record, generating check information from each data byte of a record and associating it with each said data byte to form a protected record;

transmitting each protected record of a duplicated pair respectively via two independent transmission lines to said processing means;
generating the associated check information byte-for-byte from each received record and comparing byte-for-byte the generated check information with the transmitted check information;
if for any one byte of a record the generated check information does not agree with the received check information, discarding that record;
if there is no inconsistency between the received and generated check information for both records of a duplicated pair, comparing the bits of the two records of the pair with each other;
if any difference is found between the records of the pair, discarding both records; and
otherwise storing the received records.

The present invention also provides a method of operating a telecommunications network including at least one switch means for routing calls and a processing means, comprising the steps of:
generating a record for a call including at least a plurality of data bytes; duplicating each record;
generating check information from each data byte of a record and associating it with each said data byte to form a protected record;
transmitting each protected record of a duplicated pair respectively via two independent transmission lines to said processing means;
generating the associated check information byte-for byte from each received record and comparing byte-for-byte the generated check information with the transmitted check information;
if for any one byte of a record the generated check information does not agree with the received check information, overwriting that byte with a predetermined sequence of bits;
comparing the bits of the two records of the pair with each other;
if both records of the pair have the same byte overwritten with the predetermined sequence, discarding both records;
if one record of a pair has at least one byte overwritten with the predetermined sequence but the other record has no such byte, discarding the one record; and
otherwise storing the received records.

The present invention also includes a telecommunications system including at least one switch means for routing calls and a processing means, comprising:
means for generating a record for a call including at least a plurality of data bytes;
means for duplicating each record
means for generating check information from each data byte of a record and associating it with each said data byte to form a protected record;
means for transmitting each protected record of a duplicated pair respectively via two independent transmission lines to said processing means;
means for generating the associated check information byte-for byte from each received record and for comparing byte-for-byte the generated check information with the transmitted check information,
means for discarding a record if for any one byte of that record the generated check information does not agree with the received check information;
means for comparing the bits of the two records of a duplicated pair if there is no inconsistency between the received and generated check information for both records of the duplicated pair;
means for discarding both records if any difference is found between the records of the pair; and
means for storing the received records not discarded.

The present invention also may provide a telecommunications system including at least one switch means for routing calls and a processing means, comprising:
means for generating a record for a call including at least a plurality of data bytes;
means for duplicating each record;
means for generating check information from each data byte of a record and for associating it with each said data byte to form a protected record,
means for transmitting each protected record of a duplicated pair respectively via two independent transmission lines to said processing means;
means for generating the associated check information byte-for byte from each received record and for comparing byte-for-byte the generated check information with the transmitted check information;
means for overwriting a byte of a record with a predetermined sequence of bits if for that byte the generated check information does not agree with the received check information;
means for comparing the bits of the two records of a pair with each other;
means for discarding both records if both records of the pair have the same byte overwritten with the predetermined sequence,
means for discarding one record of a pair if the one record of a pair has at least one byte overwritten with the predetermined sequence but the other record has no such byte; and
means for storing the received records which have not been discarded.

The present invention may also provide a method of operating a node associated with a telecommunications network, said node including at least one switch means for routing calls and a processing means, comprising the steps of:
generating a record for a call including at least a plurality of data bytes, duplicating each record
generating check information from each data byte of a record and associating it with each said data byte to form a protected record;
transmitting each protected record of a duplicated pair respectively via two independent transmission lines to said processing means;
generating the associated check information byte-for byte from each received record and comparing byte-for-byte the generated check information with the transmitted check information;
if for any one byte of a record the generated check information does not agree with the received check information, discarding that record;
if there is no inconsistency between the received and generated check information for both records of a duplicated pair, comparing the bits of the two records of the pair with each other;
if any difference is found between the records of the pair, discarding both records; and
otherwise storing the received records.

The present invention may provide a method of operating a node associated with a telecommunications network, said node including at least one switch means for routing calls and a processing means, comprising the steps of:

generating a record for a call including at least a plurality of data bytes;

duplicating each record;

generating check information from each data byte of a record and associating it with each said data byte to form a protected record;

transmitting each protected record of a duplicated pair respectively via two independent transmission lines to said processing means;

generating the associated check information byte-for byte from each received record and comparing byte-for-byte the generated check information with the transmitted check information;

if for any one byte of a record the generated check information does not agree with the received check information, overwriting that byte with a predetermined sequence of bits;

comparing the bits of the two records of the pair with each other;

if both records of the pair have the same byte overwritten with the predetermined sequence, discarding both records;

if one record of a pair has at least one byte overwritten with the predetermined sequence but the other record has no such byte, discarding the one record; and otherwise storing the received records.

The present invention may also provide a node for use in a telecommunications network, said node including at least one switch means for routing calls and a processing means, comprising:

means for generating a record for a call including at least a plurality of data bytes, means for duplicating each record;

means for generating check information from each data byte of a record and associating it with each said data byte to form a protected record;

means for transmitting each protected record of a duplicated pair respectively via two independent transmission lines to said processing means;

means for generating the associated check information byte-for byte from each received record and for comparing byte-for-byte the generated check information with the transmitted check information;

means for discarding a record if for any one byte of that record the generated check information does not agree with the received check information;

means for comparing the bits of the two records of a duplicated pair if there is no inconsistency between the received and generated check information for both records of the duplicated pair;

means for discarding both records if any difference is found between the records of the pair; and means for storing the received records not discarded.

The present invention may also provide a node for use in a telecommunications network, said node including at least one switch means for routing calls and a processing means, comprising:

means for generating a record for a call including at least a plurality of data bytes;

means for duplicating each record;

means for generating check information from each data byte of a record and for associating it with each said data byte to form a protected record;

means for transmitting each protected record of a duplicated pair respectively via two independent transmission lines to said processing means;

means for generating the associated check information byte-for byte from each received record and for comparing byte-for-byte the generated check information with the transmitted check information;

means for overwriting a byte of a record with a predetermined sequence of bits if for that byte the generated check information does not agree with the received check information;

means for comparing the bits of the two records of a pair with each other;

means for discarding both records if both records of the pair have the same byte overwritten with the predetermined sequence;

means for discarding one record of a pair if the one record of a pair has at least one byte overwritten with the predetermined sequence but the other record has no such byte; and means for storing the received records which have not been discarded.

In accordance with the present invention it is preferred if the records of each pair are sent at different times, i.e. asynchronously, so that the chance of identical electromagnetic disturbance of the records is reduced.

The present invention may provide the advantage of a transmission scheme which is highly reliable at rejecting transmission errors but is simple to implement.

In particular, the present invention may provide a more reliable record transmission scheme, including more reliable transmission of billing records.

The dependent claims define further embodiments of the present invention.

The present invention, its embodiments and advantages will now be described with reference to the following drawings.

BRIEF DESCRIPTION OF THE DRAWINGS

FIG. 6 shows a logic table for selection of CDR tickets in accordance with the first and third embodiments of the present invention.

DESCRIPTION OF THE ILLUSTRATIVE EMBODIMENTS

The present invention will be described with reference to certain embodiments and with reference to certain drawings but the invention is not limited thereto but only by the claims. The drawings are non-limiting schematic representations. The present invention will be described with reference to a carrier switch which could be a service switching point (SSP), and in particular to carrier switch used as a point of presence POP but the invention is not limited thereto. Generally, the switch of the present invention may be used as a node in a switching network. Further, the present invention will be described with reference to a billing scheme but the invention is not limited thereto. The present invention may find advantageous use in any part of a transmission network where records must be transmitted and processed. In accordance with the present invention a record is any identifiable group of data which should be transmitted and which records an event. A record is generally stored at least temporarily.

In accordance with the present invention a carrier switch may operate as a point of presence (POP), i.e. an interface between a telecommunication network and other networks such as customers premises equipment, a private branch exchange, a public switched telephone network, an international gateway or a mobile phone network. End users may be connected to the POP directly or by a leased line. Signaling between the POP and the switches in the various networks may be carried out using protocols for analog trunks, integrated services digital networks (ISDN), channel associated signaling (CAS), signaling system number 7 (SS7) or similar. Further, the POP must route services to and from the networks and therefore must operate as a switch. Finally, the POP must carry out certain administrative tasks such as administrating its own hardware and software as well as billing, system management and network management. In order to provide seamless integration into public networks a POP must, in particular, provide accurate information necessary for billing of calls.

Figure 1:
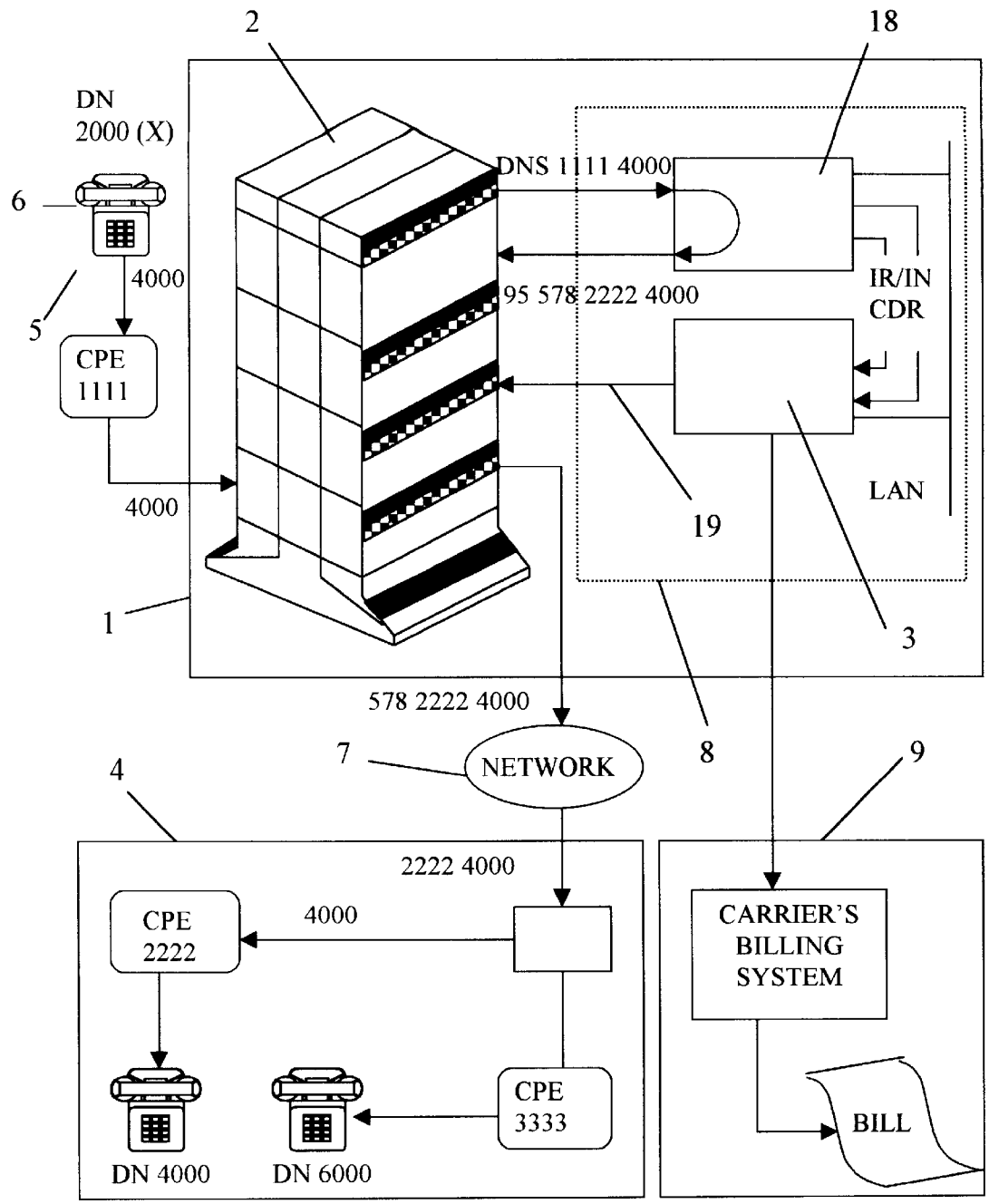
FIG. 1 shows a schematic representation of a conventional carrier switch.

FIG. 1 is a schematic representation of a carrier switch I such as the MultiMedia Carrier Switch (MMCS) supplied by Northern Telecom, Canada as an interface between telephone networks 4, 7 and a local private telephone network 5. A core switch 2 is linked to an application platform 8 which includes an external processor 3 for billing records. The application platform 8 may also contain other processors 18 for other applications. The core switch 2 is responsible for establishing connections between an end customer terminating device 6 in the local network 5 and a subscriber in a remote network 4. To do this it must manage all states of the call including initiation of the call as well as responding to the diversity of events which can affect call progress. The routing of the call is via a telecommunication backbone or network 7. The core switch 2 is typically a computer-controlled, digital switching device and is equipped with suitable central processing units such as 68040 supplied by Motorola Inc., USA to provide system control and storage of data and application computer programs for the switch 2. In particular, the core switch 2 issues a Call Detail Recording (CDR) ticket for each call that requires accounting, in particular if this call must be billed to an end customer 6 via the billing system 9 of the network. A CDR may conform to the Universal BellCore Automatic Message Accounting format or similar. The CDR ticket is transmitted over a link 19 such as an RS232C serial link, to a CDR application running on the external processor 3 in the application platform 8. Suitable hardware may be a personal computer including a Pentium processor from Intel Corp., USA having random access memory which has error correction code and non-volatile memory such as a hard disc or tape. The processor may run as a UNIX computer. For receipt and transmission of data to and from the core switch 2, the application platform 8 may include a serial connection. For communication between processor 3 and other processors on the platform an Ethernet connection may be provided.

Errors may occur during transmission of a CDR ticket from the core switch to the application platform 8. Parity checking on each byte transmitted allows for detection of single errors. For instance, a conventional core switch 2 may add a single parity checking bit for each 7 bits of information to form bytes of 8 bits total. The parity bit is typically a binary "1" or "0" depending upon whether the sum of all the bits in the byte result in an even or odd number, respectively. The data record of a CDR may include 300 bytes. If two, four, six etc. bits in a byte are incorrectly transmitted, a simple parity check will not always register an error. A complete CDR is considered erroneous by the accounting program running on the external processor 3 as soon as a parity error has been detected. One possibility of providing very accurate transmission of CDR's would be to retransmit erroneous CDR's from core switch 2 but this would involve the disadvantage of requiring the storing all CDR's at the core switch, providing some means for retransmitting erroneous tickets and a means for acknowledging correct receipt at the application platform 8 and deletion of the stored CDR at the core switch 2 on receipt of the acknowledgment. If retransmission of an erroneous CDR ticket is no carried out, there is no way of correcting the error and the only option is to throw away the received ticket leading to loss of revenue for the entity normally charging for the call. On the other hand, if a double bit error has occurred, the simple parity check mentioned above does not detect the error and the incorrect amount may be billed which is particularly troublesome when this results in the final customer being overcharged. Further, if the external processor 3 fails, the system has no method of storing the CDR's.

In accordance with the conventional carrier switch of FIG. 1 using a single RS232C link 19, and having a single parity bit in each 8 bit byte of the data of a CDR, the data being 300 octets on average in length and the error rate on an RS232C link is $10^{-7}$, then about one in 3700 CDR tickets are erroneous and are discarded. The number of CDR's resulting in wrong billing is one in $9.2 \times 10^9$.

On way of improving the transmission security would be to use a complex error correcting code. The disadvantage of such codes is that they may require as many bits as the message to be protected if accurate error correction is to be carried out. In addition such schemes require complex circuits or routines to determine the correction.

Figure 2:
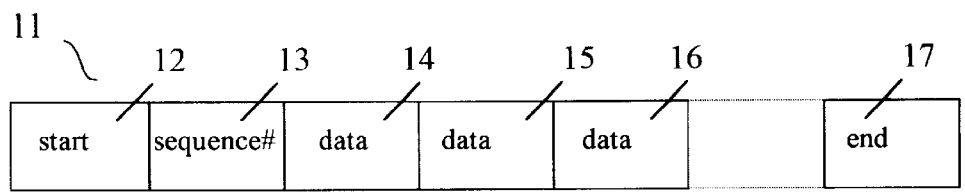
FIG. 2 shows a schematic representation of a CDR in accordance with the present invention.

A typical CDR in accordance with all the embodiments of the present invention is shown schematically in FIG. 2. The CDR or "ticket" is a frame 11 including a series of fields 12 to 17. At the beginning of the frame 11, a start field 12 is provided which includes a particular sequence of binary values which signifies the start of a frame. The next field is a sequence field 13 which indicates the sequence number of the frame. This field is optional as the time sequence of frames sent out from the core switch can be used to track the CDR's. The sequence field 13 may be 7 bytes each of 7 bits with one parity bit. The following fields 14 to 16 include data relating to the call such as subscriber numbers, start and stop times, billing rates, etc. Each data field 14 to 16 may include one byte or several bytes. Each byte of fields 14 to 16 may include 7 data bits and one parity bit. Finally, the end of the frame 11 is marked by a stop field 17.

Figure 3:
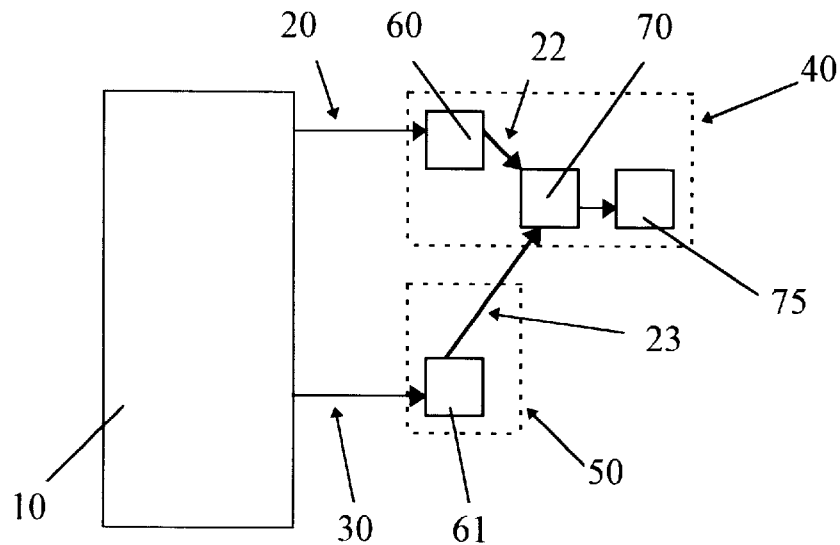
FIG. 3 shows a schematic representation of a carrier switch in accordance with a first embodiment of the present invention.

A first embodiment of the present invention is shown schematically in FIG. 3. Instead of sending only one CDR, each CDR parity protected ticket is duplicated in core switch 10. The core switch 10 transmits each pair of CDR tickets over independent links 20, 30 to two external processors 40, 50 each running a CDR application. Each processor 40, 50 may include the hardware as described for the application platform 8 described with reference to FIG. 1. The data links 20, 30 may be RS232C serial links. As two independent links 20, 30 are used, the chance of the same errors occurring on both links 20, 30 in both identical CDR's is unlikely. Further, in accordance with the present invention it is preferred if the two identical CDR's are sent at slightly different times (asynchronous transmission) because the chance of a common disturbance, e.g. switching pulses or other electromagnetic disturbances, causing the same error in both CDR's is further reduced. Each CDR record is provided with parity check bits before transmission from core switch 10 to processors 40, 50 by means of a parity generation circuit (not shown). For instance, each byte of a CDR may include 7 data bits and one parity bit determined by whether the sum of the 7 bits of a byte are even or odd. In accordance with the present invention more complex parity checking systems and error coding may be used to protect the CDR. For instance, not only byte-wise parity bits may be provided but also frame parity bits.

In accordance with the first embodiment of the present invention, a first serial bit stream including the CDR tickets from the core switch 10 is received by processor 40 via link 20 and the start field 12 is determined for each frame 11. First and second processors 40, 50 include parity checking circuits 60, 61, respectively. First processor 40 also includes a comparator 70 connected to both parity checking circuits 60, 61 via secure connection devices 22 and 23 respectively. A suitable secure connection may be an Ethernet LAN. The parity checking circuit 60 carries out a parity check on each received byte of the bit stream. If a parity error is detected in at least one byte, parity checking circuit 60 discards the complete respective CDR ticket. Similarly, a second serial bit stream including the same CDR tickets is received by the parity checking circuit 61 of external processor 50 via link 30. Parity checking circuit 61 carries out a parity check on each received byte and if a parity error is detected, the complete respective CDR ticket is discarded. Any parity error free CDR tickets are sent from the parity checking circuits 60, 61 to the comparator 70 in which bits of each accepted error-free CDR ticket from parity checking circuit 60 are compared with the bits of the other error-free CDR ticket of the same pair which has arrived from the parity checker 61. The comparison may be made bit-for-bit or byte-for-byte. The CDR tickets of the same pair may be identified even if sent at different times by comparison of the sequence numbers in fields 13 of the two records.

If a particular CDR ticket is missing (i.e. one of the pair was discarded during the parity checking stage) the CDR of this transaction which arrives at comparator 70 (i.e. has passed the parity check) is accepted and is stored on non-volatile memory 75 in processor 40, e.g. hard disc or tape. For each case that two CDR records reach comparator 70 (i.e. each has passed the parity check stage), the two CDR records are compared in comparator 70, bit-by-bit. If there is a difference between these two CDR tickets, both CDR tickets are discarded but a record of the failure is stored on nonvolatile memory 75 of processor 40, e.g. tape or hard disc. If the comparator 70 detects no difference between the two CDR's, it is assumed that both CDR's are correct and one of the CDR tickets is stored in the non-volatile memory 75 of external processor 40, e.g. on tape or hard disc. The CDR selection logic table of the combined effect of the parity checkers 60, 61 and comparator 70 of external processors 40, 50 is shown in FIG. 6.

In accordance with the first embodiment of the present invention if one parity checking circuit 60, 61 reports that there is a parity error in one of the bytes of a CDR ticket the complete CDR is discarded. The other CDR ticket of the pair may be accepted from the other parity checking circuit 61, 60 if this reports no parity error. It is very unlikely that both CDR's of a pair are erroneous. Assuming that links 22 and 23 are RS232C links having an error rate of $10^{-7}$ and the data of a CDR is typically 300 octets long and each octet includes one parity bit, the error rate caused by transmission errors in stored CDR's in accordance with the first embodiment is about one erroneous CDR ticket in $13.7 \times 10^6$. The number of stored CDR's which result in incorrect billing is one in $3.4 \times 10^{12}$. This is a significant improvement over the conventional switch and meets the requirements of the BellCore specification mentioned above.

In accordance with the first embodiment, if one of the parity checking circuits 60, 61 fails, the other parity checking circuit 61, 60 is used and the comparator 70 sends every CDR which passes the functioning parity checking circuit 61, 60 to non-volatile storage 75. Surveillance programs running on processors 40, 50 can check the functioning of parity check circuits 60, 61 regularly and isolate one of the circuits 60, 61 if it is found to be defective.

Figure 4:
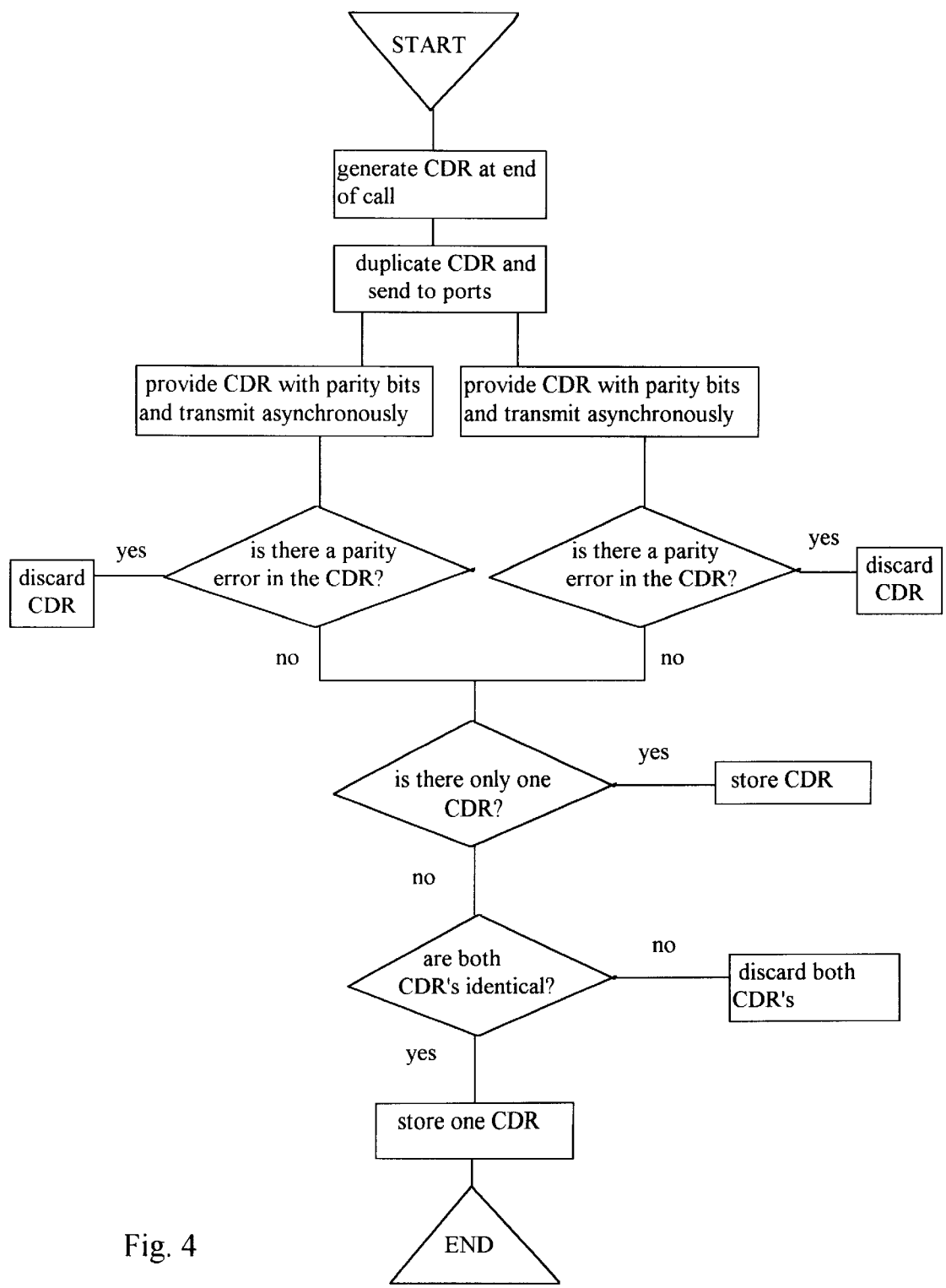
FIG. 4 shows a schematic flow diagram of the selection procedure for CDR's in accordance with the present invention.

The method of the first embodiment is now described with help of the flow diagram in FIG. 4. At the end of a call, a billing record (CDR) is generated by the core switch 10 in step 110. In step 120 the complete CDR is duplicated and transmitted to the ports of the switch 10. In steps 130A and 130B, each CDR is provided with parity bits from a parity generator and each CDR is transmitted to the respective processor 40, 50 at slightly different times (asynchronously). In each processor 40, 50 the parity of each byte of the CDR is checked and in steps 140A and 140B the CDR's with an error are discarded. In step 150 it is determined if only one CDR is delivered to the comparator 70. If yes, this CDR is stored. If both CDR's of a pair arrive at comparator 70, the bits of each CDR of a pair are compared with each other, e.g. compared bit-for-bit or byte-for-byte. In step 160, if both CDR's agree one is stored, if not they are both discarded.

In a second embodiment of the present invention, the complete CDR is not discarded immediately (steps 140A and 140B in FIG. 4) when a parity error is detected in one byte thereof Instead, the respective parity checker 60, 61 writes a sequence of binary values into the relevant byte which flags this byte as erroneous and passes the modified CDR to the comparator 70. If comparator 70 receives the two CDR's of a pair and they both have the same byte flagged as erroneous, the CDR's are discarded immediately. However, if, for example, the first CDR of a pair from parity checker 60 has byte 14 flagged as erroneous and the second CDR of the pair from parity checker 61 has no erroneously flagged bytes, the second CDR is stored and the first is discarded. If the first CDR of a pair from parity checker 60 has field 14 flagged as erroneous and the other CDR from parity checker 61 of the same pair has the byte of field 15 flagged as erroneous, comparator 70 compares the two CDR's bit-for bit. If all other fields 16 are the same in the two CDR's, comparator 70 writes the byte from field 15 of the first CDR into field 15 of the second CDR and the corrected CDR is then stored on non-volatile memory 75. Additionally or alternatively, byte 14 of the second CDR may be written into field 14 of the first CDR and both corrected CDR's stored in non-volatile memory 75. By this method some repair of faulty CDR's can be carried out.

Figure 5:
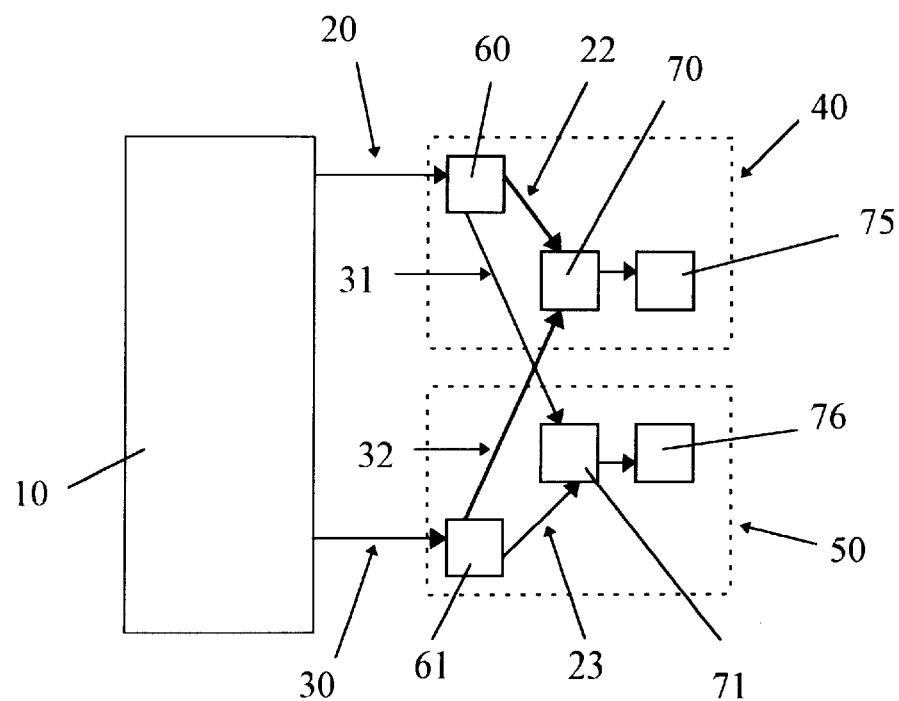
FIG. 5 shows a schematic representation of a carrier switch in accordance with the present invention.

A third embodiment of the present invention will be described with reference to FIG. 5 in which the same reference numbers refer to the same components as in the first and second embodiments. In accordance with the third embodiment, external processor 50 also includes a comparator circuit 71 which is connected via lines 31 and 32 to parity checking circuits 60 and 61 respectively. In accordance with the third embodiment of the present invention, redundancy is provided in both the parity checking circuits 60, 61 and the comparators 70, 71.

In accordance with the third embodiment, the core switch 10 generates a copy of each CDR ticket and provides each CDR record with parity bit information as described for the first embodiment. The two identical CDR tickets are transmitted via separate and independent links 20, 30 to parity checking circuits 60, 61 respectively as for the previous embodiments. Preferably, the two CDR's are sent at slightly different times, i.e. asynchronously. If a parity error is determined in a CDR by one of the parity checking circuits 60, 61 in processors, 40, 50 the relevant CDR ticket is discarded. All CDR tickets which have no parity error from parity checking circuits 60, 61 are transmitted to both comparators 70, 71 via secure transmission devices 31 and 32, respectively. In each comparator 70, 71, the bits of each CDR of the pair of CDR tickets are compared with each other, e.g. bit-for-bit or byte-for-byte. The CDR tickets of one pair may be identified by comparison of the sequence numbers in fields 13 of the two records, even if the records are sent at different times. If a difference is detected between the CDR's, both CDR tickets of the pair are discarded. If a single CDR ticket arrives at comparator 70 or 71 (i.e. it has passed the parity check but the other one of the pair did not), the CDR is stored in non-volatile memory 75 or 76. If no error is determined in the bit-for bit comparison, both CDR's are stored in non-volatile memory 75, 76. The combined effect of the external processors 40, 50 is to operate to the logic table of FIG. 6 as for the first embodiment.

In case of one of the parity checking circuits 60, 61 being defective, the other circuit 61, 60 is used for parity checking. The comparators 70, 71 send any CDR ticket which has passed the working parity checking circuit 61, 60 to non-volatile storage. The difference between the first and third embodiment occurs when one of the comparators 70, 71 is defect. If one of the comparators 70, 71 is defect, the other comparator 71, 70 is used for the comparison test. If one of the external processors 40, 50 is defect, the other processor 50, 40 is used. By means of the redundant parity checking circuits 60, 61, redundant comparators 70, 71 and redundant processors 40, 50, a CDR ticket billing scheme is provided in accordance with the present invention which has increased security and allows billing to continue despite component failures.

A fourth embodiment of the present invention will be described with reference to FIG. 5. Parity checking circuits 60, 61 each receive CDR's from lines 20, 30 and carry out a parity check on each CDR ticket. If one or more bytes of a CDR are found to be erroneous, the relevant bytes are over-written with an identifier which indicates that the byte is erroneous. Each comparator 70, 71 receives all the CDR tickets from the parity checking circuits 60, 61. If the same byte is flagged as erroneous in each CDR of a pair, both CDR's are rejected. If the first one of the CDR's of a pair contains no error flags and the other CDR of a pair does contain such a flag, the first CDR is sent to non-volatile storage 75 or 76 and the second CDR is discarded. If both CDR's of a pair contain flagged bytes, but none of the same bytes are flagged in the two records, then the bits of each record of each such pair of CDR tickets are compared with each other in comparators 70, 71, e.g. bit-for-bit or byte-for-byte. In order to construct corrected CDR's, comparators 70, 71 over-write the flagged bytes of the one CDR with the bytes having a correct parity bit from the other CDR as described for the second embodiment. Each comparator sends one corrected CDR to non-volatile storage 75, 76.

The embodiments of the invention have been described with reference to parity checkers 60, 61 and a comparator 70, 71 but these need not be hard-wired circuits. In accordance with the present invention, all the functions of the parity checking circuits 60, 61 and comparators 70, 71 can performed by appropriate software programs running on processors 40, 50. Further, any differences in arrival times of the CDR's at the parity checking circuits 60, 61 or the comparators 70, 71 can be compensated for by temporary buffering of the earliest CDR.

In the above, the present invention has been described with reference to 8-bit bytes but the invention is not limited thereto. The byte length may be freely chosen in accordance with the present invention, e.g. 4, 8, 16, 32, 64 bits in length or similar. Further, the invention has been described with reference to a single parity bit to protect each byte, however, the present invention includes also the use of a plurality of parity bits per byte to protect the data of a CDR. The present invention also includes the use of parity bits associated with groupings of data which are larger than bytes such as frame parity bits.

As is apparent from the foregoing, the present invention is susceptible of being embodied with various alterations and modifications which may differ particularly from those that have been described in the preceding specification with particular reference to the drawings. It should be understood that all such modifications as reasonable and properly, within the scope and contribution of the present invention to the art are to be embodied within the scope of the accompanying claims.

What we claim is:

1. A method of operating a telecommunications network including at least one switch means for routing calls and a processing means, comprising the steps of:

generating a billing record for a call including at least a plurality of data bytes;

duplicating each record, generating check information from each data byte of a record and associating it with each said data byte to form a protected record, transmitting each protected record of a duplicated pair respectively via two independent transmission lines to said processing means;

generating the associated check information byte-for-byte from each received record and comparing byte-for-byte the generated check information with the transmitted check information, if for any one byte of a record the generated check information does not agree with the received check information, discarding that record;

if there is no inconsistency between the received and generated check information for both records of a duplicated pair, comparing the bits of the two records of the pair with each other;

if any difference is found between the records of the pair, discarding both records; and otherwise storing the received records.

2. A method in accordance with claim 1, wherein each protected record of a pair is transmitted asynchronously with respect to the other of the pair.

3. A method in accordance with claim 1, wherein the bit comparing step is done byte-for-byte.

4. A method of operating a telecommunications network including at least one switch means for routing calls and a processing means, comprising the steps of:

generating a billing record for a call including at least a plurality of data bytes;

duplicating each record;

generating check information from each data byte of a record and associating it with each said data byte to form a protected record;

transmitting each protected record of a duplicated pair respectively via two independent transmission lines to said processing means;

generating the associated check information byte-for byte from each received record and comparing byte-for-byte the generated check information with the transmitted check information;

if for any one byte of a record the generated check information does not agree with the received check information, overwriting that byte with a predetermined sequence of bits;

comparing the bits of the two records of the pair with each other;

if both records of the pair have the same byte overwritten with the predetermined sequence, discarding both records;

if one record of a pair has at least one byte overwritten with the predetermined sequence but the other record has no such byte, discarding the one record; and otherwise storing the received records.

5. The method according to claim 4, wherein the storing step includes:

when both records of a pair include at least one byte overwritten with the predetermined sequence but neither record has the same byte overwritten with the predetermined sequence and all remaining bytes of each record are identical as determined by the bit comparison, forming a record from the bytes of either record which are consistent with their check information.

6. A method according to claim 4, wherein the bit comparing step includes comparing the records of a pair byte-for-byte.

7. A method in accordance with claim 4, in which each protected record of a pair is transmitted asynchronously with respect to the other of the pair.

8. A telecommunications system including at least one switch means for routing calls and a processing means, comprising:

means for generating a billing record for a call including at least a plurality of data bytes;

means for duplicating each record means for generating check information from each data byte of a record and associating it with each said data byte to form a protected record;

means for transmitting each protected record of a duplicated pair respectively via two independent transmission lines to said processing means;

means for generating the associated check information byte-for byte from each received record and for comparing byte-for-byte the generated check information with the transmitted check information;

means for discarding a record if for any one byte of that record the generated check information does not agree with the received check information;

means for comparing the bits the two records of a duplicated pair with each other if there is no inconsistency between the received and generated check information for both records of the duplicated pair;

means for discarding both records if any difference is found between the records of the pair; and means for storing the received records not discarded.

9. A system in accordance with claim 8, wherein the means for transmitting transmits each protected record of a pair asynchronously with respect to the other record of the pair.

10. A system according to claim 8, wherein said means for comparing bits compares the records byte-for-byte.

11. A telecommunications system including at least one switch means for routing calls and a processing means, comprising:

means for generating a billing record for a call including at least a plurality of data bytes;

means for duplicating each record;

means for generating check information from each data byte of a record and for associating it with each said data byte to form a protected record;

means for transmitting each protected record of a duplicated pair respectively via two independent transmission lines to said processing means;

means for generating the associated check information byte-for byte from each received record and for comparing byte-for-byte the generated check information with the transmitted check information;

means for overwriting a byte of a record with a predetermined sequence of bits if for that byte the generated check information does not agree with the received check information;

means for comparing the bits of the two records of a pair;

means for discarding both records if both records of the pair have the same byte overwritten with the predetermined sequence;

means for discarding one record of a pair if the one record of a pair has at least one byte overwritten with the predetermined sequence but the other record has no such byte; and means for storing the received records which have not been discarded.

12. The system according to claim 11, wherein the means for storing includes:

means for forming a record from the bytes of either record which are consistent with their check information when both records of a pair include at least one byte overwritten with the predetermined sequence but neither record has the same byte overwritten with the predetermined sequence and all remaining bytes of each record are identical as determined by the bit comparison.

13. A system in accordance with claim 11, wherein the means for transmitting transmits each protected record of a pair asynchronously with respect to the other record of the pair.

14. A system according to claim 11, wherein said means for comparing bits compares the records byte-for-byte.

15. A method of operating a node associated with a telecommunications network, said node including at least one switch means for routing calls and a processing means, comprising the steps of:

generating a billing record for a call including at least a plurality of data bytes;

duplicating each record generating check information from each data byte of a record and associating it with each said data byte to form a protected record;

transmitting each protected record of a duplicated pair respectively via two independent transmission lines to said processing means;

generating the associated check information byte-for byte from each received record and comparing byte-for-byte the generated check information with the transmitted check information;

if for any one byte of a record the generated check information does not agree with the received check information, discarding that record;

if there is no inconsistency between the received and generated check information for both records of a duplicated pair, comparing the bits of the two records of the pair with each other;

if any difference is found between the records of the pair, discarding both records; and otherwise storing the received records.

16. A method in accordance with claim 15, in which each protected record of a pair is transmitted asynchronously with respect to the other of the pair.

17. A method according to claim 15, wherein said bit comparing step includes comparing the records of a pair byte-for-byte.

18. A method of operating a node associated with a telecommunications network, said node including at least one switch means for routing calls and a processing means, comprising the steps of:

generating a billing record for a call including at least a plurality of data bytes;

duplicating each record;

generating check information from each data byte of a record and associating it with each said data byte to form a protected record;

transmitting each protected record of a duplicated pair respectively via two independent transmission lines to said processing means;

generating the associated check information byte-for byte from each received record and comparing byte-for-byte the generated check information with the transmitted check information;

if for any one byte of a record the generated check information does not agree with the received check information, overwriting that byte with a predetermined sequence of bits;

comparing the bits of the two records of the pair with each other;

if both records of the pair have the same byte overwritten with the predetermined sequence, discarding both records;

if one record of a pair has at least one byte overwritten with the predetermined sequence but the other record has no such byte, discarding the one record; and otherwise storing the received records.

19. The method according to claim 18, wherein the storing step includes:

when both records of a pair include at least one byte overwritten with the predetermined sequence but neither record has the same byte overwritten with the predetermined sequence and all remaining bytes of each record are identical as determined by the bit comparison, forming a record from the bytes of either record which are consistent with their check information.

20. A method in accordance with claim 18, wherein each protected record of a pair is transmitted asynchronously with respect to the other of the pair.

21. A method according to claim 18, wherein the bit comparing step includes comparing the records of a pair byte-for-byte.

22. A node for use in a telecommunications network, said node including at least one switch means for routing calls and a processing means, comprising:

means for generating a billing record for a call including at least a plurality of data bytes;

means for duplicating each record;

means for generating check information from each data byte of a record and associating it with each said data byte to form a protected record;

means for transmitting each protected record of a duplicated pair respectively via two independent transmission lines to said processing means;

means for generating the associated check information byte-for byte from each received record and for comparing byte-for-byte the generated check information with the transmitted check information;

means for discarding a record if for any one byte of that record the generated check information does not agree with the received check information;

means for comparing the bits of the two records of a duplicated pair with each other if there is no inconsistency between the received and generated check information for both records of the duplicated pair;

means for discarding both records if any difference is found between the records of the pair; and means for storing the received records not discarded.

23. A node in accordance with claim 22, wherein the means for transmitting transmits each protected record of a pair asynchronously with respect to the other record of the pair.

24. A node in accordance with claim 22, wherein said means for comparing bits compares the records of a pair byte-for-byte.

25. A node for use in a telecommunications network, said node including at least one switch means for routing calls and a processing means, comprising:

means for generating a billing record for a call including at least a plurality of data bytes;

means for duplicating each record;

means for generating check information from each data byte of a record and for associating it with each said data byte to form a protected record;

means for transmitting each protected record of a duplicated pair respectively via two independent transmission lines to said processing means;

means for generating the associated check information byte-for byte from each received record and for comparing byte-for-byte the generated check information with the transmitted check information;

means for overwriting a byte of a record with a predetermined sequence of bits if for that byte the generated check information does not agree with the received check information;

means for comparing the bits of the two records of a pair with each other;

means for discarding both records if both records of the pair have the same byte overwritten with the predetermined sequence;

means for discarding one record of a pair if the one record of a pair has at least one byte overwritten with the predetermined sequence but the other record has no such byte; and means for storing the received records which have not been discarded.

26. The node according to claim 25, wherein the means for storing includes.

means for forming a record from the bytes of either record which are consistent with their check information when both records of a pair include at least one byte overwritten with the predetermined sequence but neither record has the same byte overwritten with the predetermined sequence and all remaining bytes of each record are identical as determined by the bit comparison.

27. A node in accordance with claim 26, wherein the means for transmitting transmits each protected record of a pair asynchronously with respect to the other record of the pair.

28. A node in accordance with claim 26, wherein said means for comparing bits compares the records of a pair byte-for-byte.

* * * * *